Figure 1:
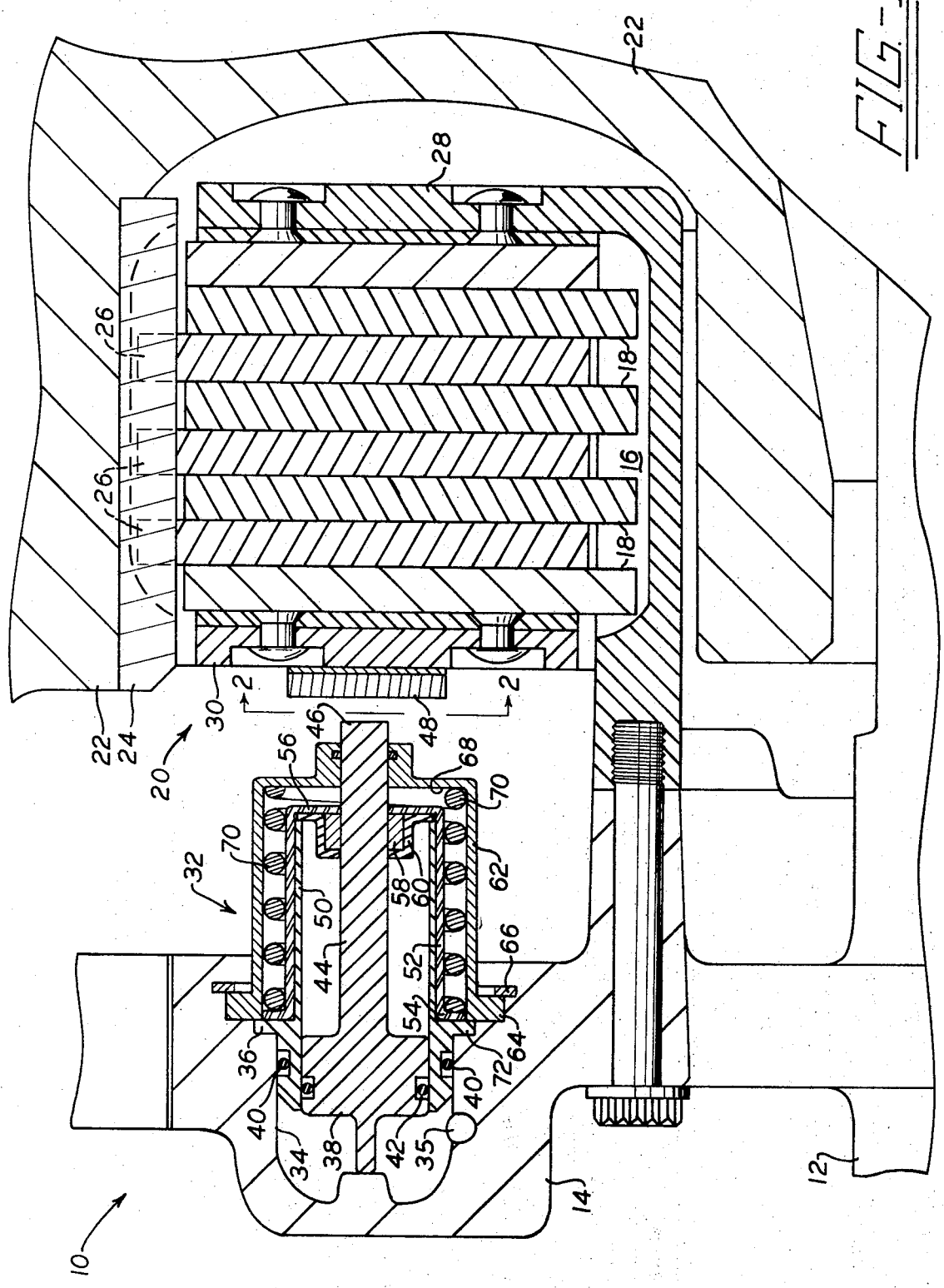

United States Patent [19]
Angelis et al.

[11] 3,811,366
[45] May 21, 1974

[54] COMBINED PISTON-RETURN MECHANISM

[75] Inventors: William J. Angelis; Robert E. Berger, both of North Canton; Robert E. Conkey, Barberton, all of Ohio

[73] Assignee: The Goodyear Tire & Rubber Company, Summit, Ohio

[22] Filed: Mar. 31, 1972

[21] Appl. No.: 240,183

[52] U.S. Cl. .................... 92/130, 92/15, 188/196 P
[51] Int. Cl. ..................... F01b 31/00, F15b 15/26
[58] Field of Search............. 92/130, 15, 29, 417 R, 92/341; 188/196 P, 71.8

[56] References Cited
UNITED STATES PATENTS

| | | | |
|---|---|---|---|
| 2,875,864 | 3/1959 | Kirk | 92/130 |
| 3,188,048 | 6/1965 | Sutherland | 91/130 |
| 3,331,289 | 7/1967 | Horst | 91/417 R |
| 3,524,715 | 8/1970 | Grantham | 92/130 |
| 2,040,707 | 5/1936 | Palmer | 92/130 |

Primary Examiner—Paul E. Maslousky
Attorney, Agent, or Firm—Oldham & Oldham

[57] ABSTRACT

A brake actuating piston which includes a return mechanism for moving the piston to its at rest position when brake pressure is released. The piston moves in a cylindrical sleeve. A cylindrical spring holder surrounds the sleeve and is connected to the piston stem by a friction grip. A coil spring carried by the holder is compressed when the piston is moved toward the applied position and expands upon release of brake pressure to move the holder and the piston back to their at rest positions.

3 Claims, 2 Drawing Figures

COMBINED PISTON-RETURN MECHANISM

The present invention relates to a brake piston and more particularly to such a brake piston which is provided with an automatic return mechanism.

The pistons of the present invention are intended for use with aircraft brakes of the type having a stack of discs consisting of alternate rotating and stationary discs carried between a fixed back plate and an axially movable pressure plate. In such brake installations, a plurality of pistons arranged in a circular pattern engage the pressure plate to move the pressure plate axially toward the back plate so that the discs are clamped tightly against one another to achieve braking action. In such a braking assembly it is preferable that, upon release of braking pressure, the piston be moved back to its at rest position so that the discs may separate sufficiently to allow adequate cooling. Also, if means are provided for moving the piston back to an at rest position, heat transfer through the pressure plate and brake pistons to the hydraulic fluid of the braking system is substantially reduced, resulting in increased life of the braking system. In prior arrangements return springs have been attached directly to the pressure plate. However, with such arrangements the pressure plate is subjected to bending moments which decrease the effective life of the pressure plate.

It is the primary object of the present invention to provide a brake piston incorporating a return mechanism to bring the pistons to their brake released position immediately upon release of hydraulic pressure.

It is also an object of the present invention to provide a brake piston and return mechanism assembly which eliminates the necessity of mechanical attachment between the return springs and the pressure plate.

Another object of the invention is the provision of a piston and return mechanism which automatically adjusts for wear of the friction surfaces of the brake assembly.

A further object of the present invention is to provide a brake piston and return mechanism assembly which may be economically fabricated and easily assembled.

The above and other objects of the invention which will become apparent in the following detailed description are achieved by providing a brake piston and return mechanism assembly which consists, essentially, of a piston, a cylinder sleeve in which the piston moves, a cylindrical spring retaining member surrounding the sleeve and connected to the piston stem by a grip connection, a compression coil spring acting between the spring carrier and a fixed member, the spring being compressed upon brake actuation and expanding upon brake release to move the piston toward its brake released or at rest position, and a bearing plate for transmitting force from the end of the piston stem to the pressure plate of the brake assembly.

The above and other objects and advantages of the invention will become apparent upon consideration of the following detailed description and the accompanying drawings wherein there is shown a preferred embodiment of the invention.

Figure 2:
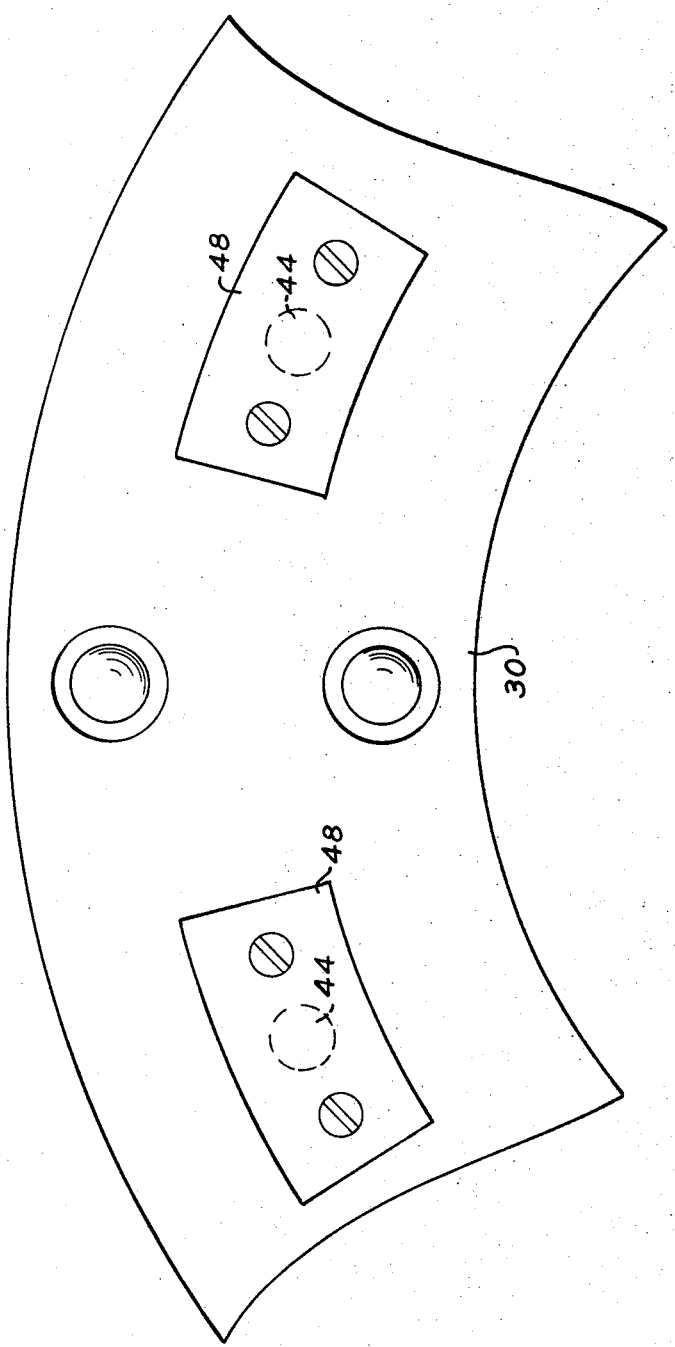

In the drawing:

FIG. 1 is an elevational sectional view of a brake piston and return mechanism assembly constructed in accordance with the principles of the present invention; and FIG. 2 is a fragmentary elevational view taken along the line 2—2 of FIG. 1.

A wheel and brake assembly is designated generally by the reference numeral 10 and includes a stationary axle 12 to which is affixed a housing 14 having splines 16 to receive the stationary brake discs 28 of a brake assembly 20. Rotatably carried on the axle 12 is a wheel 22 which is provided with splines 24 for engaging the rotating disc 26 of the brake assembly 20, the discs 18 and 26 being interleaved with one another and carried between a fixed back plate 28 and an axially movable pressure plate 30. The piston assembly 32 of the present invention engages the pressure plate 30 and, when actuated by suitable hydraulic pressure, forces the pressure plate axially toward the back plate 28 so that the discs 18 and 26 are clamped between one another and between the pressure plate 30 and back plate 28 to exert braking force.

As is conventional, a plurality of piston assemblies 32 are provided in the housing 14, the assemblies being located in a circle concentric with the axle 12.

The housing 14 is provided with a cylindrical bore 34 for each of the piston assemblies 32 and a cylinder sleeve 36 is received in this bore and projects axially toward the brake disc assembly 20. Slidably received within the sleeve 36 is a piston 38, the bore 34 being connected by suitable ports 35 to the hydraulic pressure source to provide pressure to the inner face of the piston 38. Suitable sealing means such as the O-rings 40 and 42 are provided to provide a fluid type seal for the bore 34. The piston 32 has a stem 44 which bears at its outer end 46 against a plate 48 riveted or otherwise connected to the pressure plate 30. Surrounding the proportion 50 of the cylinder sleeve 36 which projects from the bore 34 is a spring retaining member 52, the member 52 being cylindrical and having an outwardly projecting annular flange 54 at one end and extending inwardly towards stem 44 at the opposite end, as indicated at 56. A grip member 58 encircles and frictionally engages the piston stem 44 adjacent the inwardly projecting end 56 of the spring retaining sleeve, the grip member being retained by a cup-like retaining plate 60 connected to the end 56 of the spring retaining sleeve 52. A cup-like outer housing sleeve 62 surrounds the spring retaining sleeve 52 and has an outwardly projecting annular flange 64 which is retained in the fixed housing 14 by a retaining ring 66. It will be noted that the cylinder sleeve 36 has an outwardly projecting annular shoulder 72 which engages the upper end 64 of the outer sleeve 62 so that the sleeve 36 is retained in place by the housing 62 and retaining ring 66. A coil spring 70 is carried in the annular space between the spring retaining sleeve 52 and the outer housing 62, the spring bearing against the outwardly projecting annular flange 54 of the spring retaining sleeve and the end portion 68 of the housing 62.

Upon actuation of the brake by any suitable control means hydraulic pressure supplied to the port 35 forces the piston 38 toward the brake stack assembly 20 so that the stem 44 engages the plate 48 forcing the pressure plate 30 toward the backing plate. As the piston 38 moves toward the brake assembly 20 the spring retaining sleeve 52 moves with the piston compressing the spring 70 until the end 56 of the retaining sleeve 52 contacts the end 68 of the fixed idle housing 62. The grip 58 permits continued movement of the piston 38 and stem 44.

Upon release of brake pressure the restraining force on the spring 70 is released and the spring 70 expands moving the retaining sleeve 52 toward its at rest position. The grip 58 engages the stem 44 of the piston 38 so that the piston 38 is also moved back toward its at rest position.

It should be noted that the piston may move a greater distance toward the brake assembly under the action of hydraulic fluid than it moves away from the brake assembly under the action of the spring 70 since the range of travel of the spring 70 is limited. Any additional outward movement of the piston is necessitated by wear of the friction surfaces of the brake discs. By limiting the amount of return movement the piston assembly is automatically positioned at the preferred point for reapplication of brake pressure, a minimum amount of lost motion being necessary before brake action is achieved.

While only the best known embodiment of the invention has been illustrated and described in detail herein it should be understood that the invention is not limited thereto or thereby. Rather, modifications and/or additions may be made in and to the embodiment described without departing from the true scope of the invention. Reference should therefore be had to the appended claims in determining the scope of the invention.

What is claimed is:

1. A brake piston and return mechanism assembly, comprising:
   a housing having a cylindrical bore;
   a piston received within the bore and having a stem projecting coaxially therefrom;
   spring means;
   first and second connecting means for connecting the first and second ends of the spring means to the piston stem and the housing, respectively, whereby the spring means exerts an opposing force on the piston stem when the piston moves toward its extended position; and
   the first connecting means comprising a slidably positioned cylindrical sleeve located concentricly of the piston stem, having an outwardly projecting annular flange at one end which engages the first end of the spring means, and operatively connected at the opposite end to the piston stem for movement therewith, said sleeve is connected to the piston stem by means of a friction grip connection permitting movement of the piston stem relative to the sleeve.

2. A piston and return mechanism assembly, comprising:
   a housing having an open-ended cylindrical bore and port means connecting the bore to a fluid pressure source;
   a piston received in the bore and having a stem extending coaxially from the bore;
   a first cup-like sleeve concentric with the stem and having an outwardly projecting annular flange at the open end of the sleeve;
   connecting means attaching the closed end of the sleeve to the stem;
   a second cup-like sleeve surrounding the first sleeve and connected at its open end to the housing;
   a coil spring positioned between the first and second sleeves and bearing against the annular flange of the first sleeve and the closed end of the second sleeve; and
   the connecting means comprises friction grip means permitting movement of the stem relative to the first cup-like sleeve.

3. A piston and return mechanism assembly, comprising:
   a housing having an open-ended cylindrical bore and port means connecting the bore to a fluid pressure source;
   a piston received in the bore and having a stem extending coaxially from the bore;
   a first cup-like sleeve concentric with the stem and having an outwardly projecting annular flange at the open end of the sleeve;
   connecting means attaching the closed end of the sleeve to the stem;
   a second cup-like sleeve surrounding the first sleeve and connected at its open end to the housing;
   a coil spring positioned between the first and second sleeves and bearing against the annular flange of the first sleeve and the closed end of the second sleeve;
   an open-ended cylindrical sleeve received within the bore and projecting partially into the first cup-like sleeve, the piston being slidably received in the cylindrical sleeve; and
   the bore having an enlarged diameter outer portion, the cylindrical sleeve having an outwardly projecting annular shoulder extending into the outer portion of the bore, and the open end of the second cup-like sleeve extending into the outer portion of the bore to retain the cylindrical sleeve in place.

* * * * *